United States Patent
Finsinger

(10) Patent No.: US 10,353,448 B2
(45) Date of Patent: Jul. 16, 2019

(54) COMPUTER MAINBOARD, VOLTAGE SUPPLY MODULE AND METHOD FOR VOLTAGE SUPPLY OF A COMPUTER MAINBOARD

(71) Applicant: Fujitsu Technology Solutions Intellectual Property GmbH, München (DE)

(72) Inventor: Michael Finsinger, Leitershofen (DE)

(73) Assignee: Fujitsu Technology Solutions Intellectual Property GmbH, Münich (DE)

( * ) Notice: Subject to any disclaimer, the term of this patent is extended or adjusted under 35 U.S.C. 154(b) by 124 days.

(21) Appl. No.: 15/456,973

(22) Filed: Mar. 13, 2017

(65) Prior Publication Data

US 2017/0269660 A1    Sep. 21, 2017

(30) Foreign Application Priority Data

Mar. 16, 2016   (DE) .......................... 10 2016 104 870

(51) Int. Cl.
  *G06F 1/26*   (2006.01)
  *G06F 1/30*   (2006.01)
(52) U.S. Cl.
  CPC ............... *G06F 1/263* (2013.01); *G06F 1/30* (2013.01)
(58) Field of Classification Search
  None
  See application file for complete search history.

(56) References Cited

U.S. PATENT DOCUMENTS

| | | | | |
|---|---|---|---|---|
| 5,588,124 | A * | 12/1996 | Hongo | ................ G06F 13/4213 710/107 |
| 6,348,744 | B1 * | 2/2002 | Levesque | .............. H02J 7/0065 307/86 |
| 2002/0062455 | A1 * | 5/2002 | Lee | ........................ G06F 1/3203 713/323 |
| 2003/0032311 | A1 | 2/2003 | Lin et al. | |
| 2003/0122532 | A1 | 7/2003 | Yuan | |
| 2007/0270028 | A1 | 11/2007 | Huang | |
| 2010/0223481 | A1 | 9/2010 | Huang et al. | |

(Continued)

FOREIGN PATENT DOCUMENTS

DE    10 2008 003 986 B3    8/2009

*Primary Examiner* — Paul Yen
(74) *Attorney, Agent, or Firm* — DLA Piper LLP (US)

(57) ABSTRACT

A computer mainboard includes components intended for operating a computer, a control logic that controls voltage supply of the computer mainboard, and a connector plug that receives at least one supply voltage (+12V DC) specified for the computer mainboard, an auxiliary voltage (Vin_ext_DC) and a monitoring signal (Vin_ext_OK) that indicates the presence of an external supply voltage (VEXT_DC, VEXT_AC) that has a predetermined specification, wherein the control logic is configured to detect the monitoring signal (Vin_ext_OK) via the connector plug and, after detection of the monitoring signal (Vin_ext_OK), to generate a first control signal (EN_REG_EB#) and output it to the outside via the connector plug so that, depending thereon, an external voltage supply device can be activated to provide the at least one supply voltage (+12V DC) specified for the computer mainboard from the external supply voltage (VEXT_DC, VEXT_AC).

11 Claims, 4 Drawing Sheets

(56) References Cited

U.S. PATENT DOCUMENTS

| | | | | |
|---|---|---|---|---|
| 2010/0301908 A1* | 12/2010 | Chen | ............... | G06F 1/26 327/143 |
| 2011/0271131 A1* | 11/2011 | Lefebvre | ............... | G06F 1/26 713/323 |
| 2014/0042819 A1* | 2/2014 | Yu | ............... | H02J 9/005 307/80 |

* cited by examiner

Fig. 1

ATX

| 13 | 14 | 15 | 16 | 17 | 18 | 19 | 20 | 21 | 22 | 23 | 24 |
|---|---|---|---|---|---|---|---|---|---|---|---|
| +3.3 VDC | -12 VDC | COM | PS_ON# | COM | COM | COM | -5V or NC | +5V VDC | +5 VDC | +5 VDC | COM |
| +3.3 VDC | +3.3 VDC | COM | +5 VDC | COM | +5 VDC | COM | PWR_OK | +5V AUX | +12V1 DC | +12V1 DC | +3.3 VDC |
| 1 | 2 | 3 | 4 | 5 | 6 | 7 | 8 | 9 | 10 | 11 | 12 |

| 3 | 4 |
|---|---|
| +12V2 DC | +12V2 DC |
| COM | COM |
| 1 | 2 |

12V

| 13 | 14 | 15 | 16 | 17 | 18 | 19 | 20 | 21 | 22 | 23 | 24 |
|---|---|---|---|---|---|---|---|---|---|---|---|
| +3.3V out | n/c | COM | n/c | COM | COM | COM | +12V out | +5V out | +5V out | +5V out | COM |
| +3.3V out | +3.3V out | n/c | +5V out | COM | +5V out | COM | n/c | n/c | +12V1 DC | +12V1 DC | +3.3V out |
| 1 | 2 | 3 | 4 | 5 | 6 | 7 | 8 | 9 | 10 | 11 | 12 |

| 3 | 4 |
|---|---|
| +12V2 DC | +12V2 DC |
| COM | COM |
| 1 | 2 |

Extension Board

| 13 | 14 | 15 | 16 | 17 | 18 | 19 | 20 | 21 | 22 | 23 | 24 |
|---|---|---|---|---|---|---|---|---|---|---|---|
| +3.3V out | Vin_ext DC | COM | PS_ON# | COM | COM | COM | +12V out | +5V out | +5V out | +5V out | COM |
| +3.3V out | +3.3V out | n/c | +5V out | GND | +5V out | COM | Vin_ext_OK | n/c | +12V1 DC | +12V1 DC | +3.3V out |
| 1 | 2 | 3 | 4 | 5 | 6 | 7 | 8 | 9 | 10 | 11 | 12 |

| 3 | 4 |
|---|---|
| +12V2 DC | +12V2 DC |
| COM | COM |
| 1 | 2 |

COMPUTER MAINBOARD, VOLTAGE SUPPLY MODULE AND METHOD FOR VOLTAGE SUPPLY OF A COMPUTER MAINBOARD

TECHNICAL FIELD

This disclosure relates to a computer mainboard for the intended operation of a computer system, a voltage supply module for voltage supply of such a computer mainboard and a method for voltage supply of a computer mainboard.

BACKGROUND

Conventional computer mainboards can only be supplied by a voltage supply specifically provided and configured to that end. A voltage supply essentially includes a supply via specifically designed power supply units. A common voltage supply provides for the supply via an ATX power supply unit in an ATX operation according to the ATX standard (Advanced Technology Extended) in which the ATX power supply unit connects to the ATX connector plug present on the computer mainboard. In this case, the computer mainboard can be supplied via various predetermined supply voltages, in particular +/−12 V, +/−5 V and +3.3 V. Such a voltage supply concept is used in desktop computers, for example.

Another possibility of supplying voltage to a computer mainboard provides for a supply via a single supply voltage (so-called "single operation"). In that case, a supply via a supply voltage of +12V is conceivable, for example. Supply in single operation can be effected either via an ATX power supply unit or via a proprietary power supply unit. Such a singe single operation voltage supply concept is used in portable computers such as notebooks or tablets, for example.

Computer mainboards can be equipped with a voltage supply concept that includes a suitable detection and control logics for differentiation between different voltage supply options. Thus, it is readily possible to operate the computer mainboard either in ATX operation or in single operation of the above-described type. Such a flexibility comes with the advantage that a computer mainboard of a predetermined type can be operated with different voltage supplies without having to provide different types of computer mainboards for different voltage supplies. This facilitates both the conception of flexible computer systems and the reaction to certain customer needs.

However, a disadvantage of voltage supplies of a computer mainboard that have been used so far lies with the fact that the field of application of a corresponding computer mainboard remains restricted to specifically designed voltage supplies in which is ensured that they allow operating the computer mainboard according to standardized specifications and supply the supply voltage(s) specified for the computer mainboard.

It could therefore be helpful to provide a voltage supply concept for a computer mainboard that allows an extended nevertheless safe field of application of common computer mainboards without having to provide structurally extensive modifications to the computer mainboard.

SUMMARY

I provide a computer mainboard including components intended for operating a computer, a control logic that controls voltage supply of the computer mainboard, and a connector plug that receives at least one supply voltage (+12V DC) specified for the computer mainboard, an auxiliary voltage (Vin_ext_DC) and a monitoring signal (Vin_ext_OK) that indicates the presence of an external supply voltage (VEXT_DC, VEXT_AC) that has a predetermined specification, wherein the control logic is configured to detect the monitoring signal (Vin_ext_OK) via the connector plug and, after detection of the monitoring signal (Vin_ext_OK), to generate a first control signal (EN_REG_EB#) and output it to the outside via the connector plug so that, depending thereon, an external voltage supply device can be activated to provide the at least one supply voltage (+12V DC) specified for the computer mainboard from the external supply voltage (VEXT_DC, VEXT_AC).

I also provide a voltage supply module for voltage supply of the computer mainboard including components intended for operating a computer, a control logic that controls voltage supply of the computer mainboard, and a connector plug that receives at least one supply voltage (+12V DC) specified for the computer mainboard, an auxiliary voltage (Vin_ext_DC) and a monitoring signal (Vin_ext_OK) that indicates the presence of an external supply voltage (VEXT_DC, VEXT_AC) that has a predetermined specification, wherein the control logic is configured to detect the monitoring signal (Vin_ext_OK) via the connector plug and, after detection of the monitoring signal (Vin_ext_OK), to generate a first control signal (EN_REG_EB#) and output it to the outside via the connector plug so that, depending thereon, an external voltage supply device can be activated to provide the at least one supply voltage (+12V DC) specified for the computer mainboard from the external supply voltage (VEXT_DC, VEXT_AC), including a main voltage supply that provides a supply voltage (+12V DC) specified for the computer mainboard from an external input voltage (VEXT_DC, VEXT_AC), an auxiliary voltage converter that converts the external input voltage (VEXT_DC, VEXT_AC) into an auxiliary voltage (Vin_ext_DC), and a power supply plug that electrically cooperates with the connector plug at the computer mainboard to supply the computer mainboard with the supply voltage (+12V DC), specified for the computer mainboard, or the auxiliary voltage (Vin_ext_DC), wherein the voltage supply module is configured to provide a monitoring signal (Vin_ext_OK) at the power supply plug of the control logic of the computer mainboard, which indicates that the external input voltage (VEXT_DC, VEXT-AC) has a predetermined specification.

I further provide an assembly including the computer mainboard including components intended for operating a computer, a control logic that controls voltage supply of the computer mainboard, and a connector plug that receives at least one supply voltage (+12V DC) specified for the computer mainboard, an auxiliary voltage (Vin_ext_DC) and a monitoring signal (Vin_ext_OK) that indicates the presence of an external supply voltage (VEXT_DC, VEXT_AC) that has a predetermined specification, wherein the control logic is configured to detect the monitoring signal (Vin_ext_OK) via the connector plug and, after detection of the monitoring signal (Vin_ext_OK), to generate a first control signal (EN_REG_EB#) and output it to the outside via the connector plug so that, depending thereon, an external voltage supply device can be activated to provide the at least one supply voltage (+12V DC) specified for the computer mainboard from the external supply voltage (VEXT_DC, VEXT_AC), and the voltage supply module for voltage supply of the computer mainboard including components intended for operating a computer, a control logic that controls voltage supply of the computer mainboard, and a connector plug that receives at least one supply voltage (+12V DC) specified for the computer mainboard, an auxiliary voltage (Vin_ext_DC) and a monitoring signal (Vin_ext_OK) that indicates the presence of an external supply voltage (VEXT_DC, VEXT_AC) that has a predetermined specification, wherein the control logic is configured to detect the monitoring signal (Vin_ext_OK) via the connector plug and, after detection of the monitoring signal (Vin_ext_OK), to generate a first control signal (EN_REG_EB#) and output it to the outside via the connector plug so that, depending thereon, an external voltage supply device can be activated to provide the at least one supply voltage (+12V DC) specified for the computer mainboard from the external supply voltage (VEXT_DC, VEXT_AC), including a main voltage supply that provides a supply voltage (+12V DC) specified for the computer mainboard from an external input voltage (VEXT_DC, VEXT_AC), an auxiliary voltage converter that converts the external input voltage (VEXT_DC, VEXT_AC) into an auxiliary voltage (Vin_ext_DC), and a power supply plug that electrically cooperates with the connector plug at the computer mainboard to supply the computer mainboard with the supply voltage (+12V DC), specified for the computer mainboard, or the auxiliary voltage (Vin_ext_DC), wherein the voltage supply module is configured to provide a monitoring signal (Vin_ext_OK) at the power supply plug of the control logic of the computer mainboard, which indicates that the external input voltage (VEXT_DC, VEXT-AC) has a predetermined specification.

I also further provide a method of supplying voltage to a computer mainboard by at least one supply voltage (+12V DC) specified for the computer mainboard, which is provided by a voltage supply module from an external input voltage (VEXT_DC, VEXT_AC) by a voltage supply module, including providing an auxiliary voltage (Vin_ext_DC) from the external input voltage (VEXT_DC, VEXT_AC) by the voltage supply module for operating a control logic of the computer mainboard, providing a monitoring signal (Vin_ext_OK) by the voltage supply module, wherein the monitoring signal (Vin_ext_OK) indicates that the external input voltage (VEXT_DC, VEXT_AC) has a predetermined specification, detecting the monitoring signal (Vin_ext_OK) by the control logic of the computer mainboard, generating a first control signal (EN_REG_EB#) by the control logic of the computer mainboard after detection of the monitoring signal (Vin_ext_OK), outputting the first control signal (EN_REG_EB#) to the voltage supply module at a connector plug by a control signal circuit of the computer mainboard, activating a main supply voltage of the voltage supply module for providing the supply voltage (+12V DC) specified for the computer mainboard from the external input voltage (VEXT_DC, VEXT_AC) depending on the first control signal (EN_REG_EB#), providing the supply voltage (+12V DC), specified for the computer mainboard, to the computer mainboard, and operating the computer mainboard by the provided supply voltage (+12V DC) specified for the computer mainboard.

BRIEF DESCRIPTION OF THE DRAWINGS

FIG. 1 is a schematic illustration of a comparison of a configuration of a connector plug for various power supply concepts.

Figure 2:
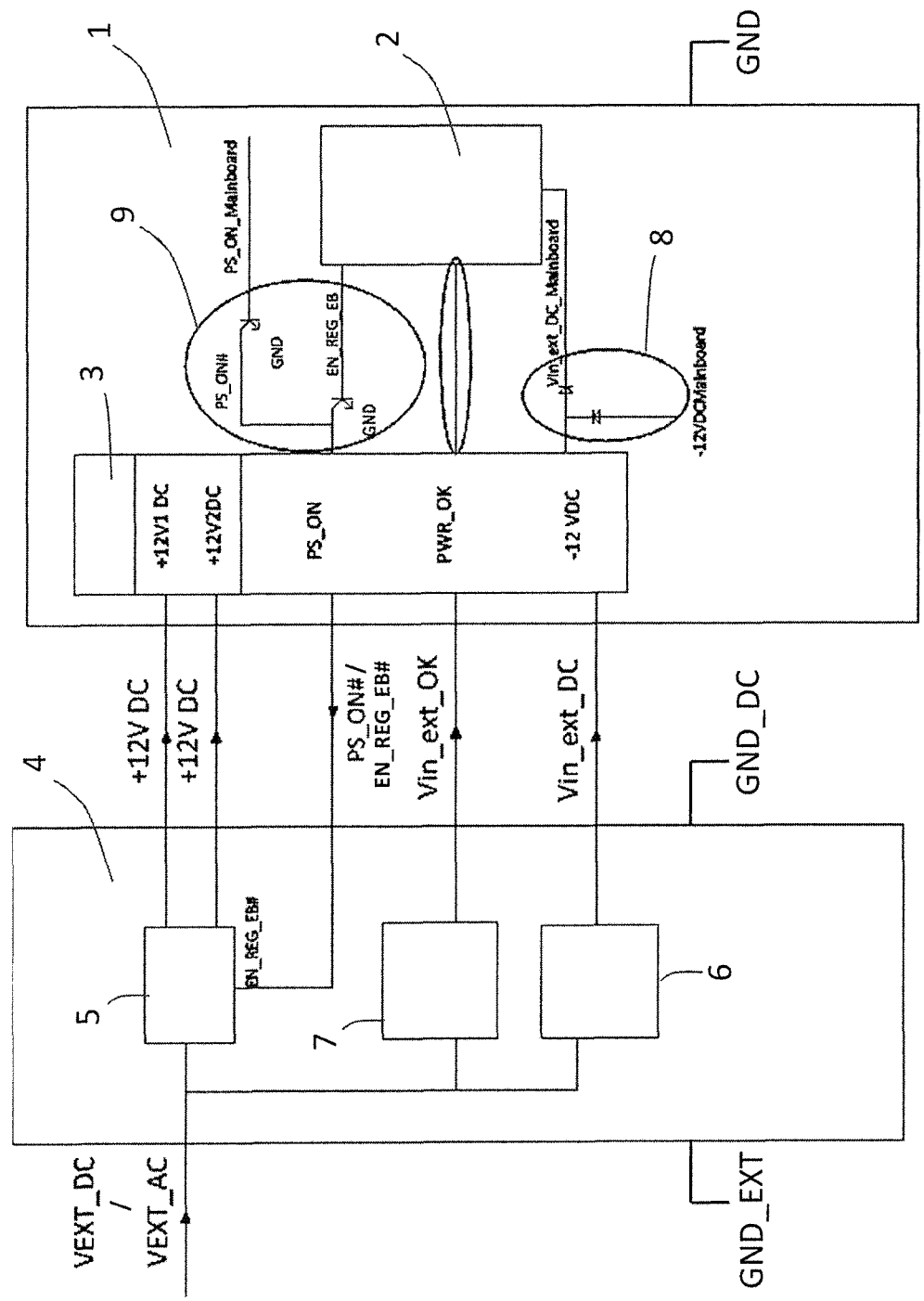
FIG. 2 is a schematic illustration of an example of a circuit-related assembly having a voltage supply module and a computer mainboard.

LIST OF REFERENCE NUMERALS 1 computer mainboard
2 control logic
3 connector plug
4 voltage supply module
5 main voltage converter
6 auxiliary voltage converter
7 monitoring circuit
8 protective circuit
9 control signal circuit
+12V DC supply voltage
Vin_ext_DC auxiliary voltage
Vin_ext_OK monitoring signal
VEXT_DC, VEXT_AC external supply-/input voltage
EN_REG_EB# first control signal
PS_ON# ATX control signal
PS_ON_Mainboard second control signal
−12VDCMainboard supply line
Vin_ext_DC Mainboard auxiliary voltage input at control logic
+12V1 DC supply voltage port
+12V2 DC supply voltage port
PS_ON# control port
PWR_OK monitoring port
−12 VDC auxiliary voltage port
COM, GND ground
S1 to S6 signal states

DETAILED DESCRIPTION

Our computer mainboard comprises components intended for operating a computer. Further, a control logic that controls the voltage supply of the computer mainboard is configured on the computer mainboard. The computer mainboard comprises a connector plug that receives at least one supply voltage specified for the computer mainboard and an auxiliary voltage.

Furthermore, the connector plug is configured to receive a monitoring signal. The monitoring signal is a signal distinct and separate from the supply voltage and the auxiliary voltage. The monitoring signal indicates the presence of an external supply voltage having a predetermined specification. The predetermined specification can define that the input voltage deviates from the supply voltage specified for the computer mainboard, e.g., that the absolute value thereof is higher or lower and/or is an alternating (AC) voltage of a predetermined frequency. Alternatively, the specification may merely define that the input voltage corresponds to the supply voltage specified for the computer mainboard, but originates from a special voltage supply concept.

The control logic is configured to detect the monitoring signal via the connector plug and, after detection of the monitoring signal, to generate a first control signal and output it via the connector plug. Depending thereon, an external voltage supply device can be activated to provide the at least one supply voltage specified for the computer mainboard from the present external supply voltage.

Such a computer mainboard provides the advantage that the field of application thereof can be expanded to most different voltage supplies. Besides common voltage supplies (e.g., ATX operation or single operation) specifically configured to provide specified supply voltages according to standardized provisions, the computer mainboard may also consider further voltage supplies according to deviating specifications for the operation of the mainboard.

The monitoring signal received at the connector plug can be detected by the control logic, the monitoring signal indicating to the control logic the presence of a predetermined specification of an external supply voltage or an external voltage supply per se, which deviate from conventional standardized specifications, but nevertheless enable operating the computer mainboard. The control logic can thereby set the operating behavior of the computer mainboard to an operation by a present external voltage supply that deviates from conventional voltage supplies in terms of its specification.

Due to the functionality of the first control signal of the control logic, which is generated depending on the detection of the monitoring signal, activation of a voltage supply device to provide the supply voltage specified for the computer mainboard from the external supply voltage can be controlled. This ensures that providing a supply voltage (e.g., voltage conversion and transmission) and, finally, operation of the computer mainboard are permitted only if the present specification of the external voltage supply enables erroneous operation of the computer mainboard. This prevents damage from being caused to the computer mainboard by connection to an operationally non-compliant voltage supply. Furthermore, this also ensures protection of the external voltage supply against overloads.

The connector plug may be designed as an ATX power supply plug according to the ATX standard. In this way, a conventionally provided, standardized connector plug can be used on the computer mainboard for the voltage supply concept illustrated herein without having to provide a specific (eventually proprietary) connector plug or having to make extensive modifications to the computer mainboard. It is up to the manufacturer of corresponding computer mainboards to equip a computer mainboard with an ATX-conformable connector plug, in which all connector pins are configured according to the ATX standard, or to equip the computer mainboard with an ATX-conformable connector plug in which only part of the connector pins thereof guide the signals described herein and another part of its connector pins is covered otherwise or remains uncovered.

Advantageously, the connector plug is configured to receive the at least one supply voltage specified for the computer mainboard, the auxiliary voltage and the monitoring signal at different ATX ports.

In the connector plug according to the ATX standard, the connector plug is configured to receive the auxiliary voltage at a predetermined auxiliary voltage port configured according to the ATX standard for the supply of an ATX (main) supply voltage on a supply line of the computer mainboard. In particular, this ATX (main) supply voltage is different from an ATX standby voltage. For example, the predetermined auxiliary port defined herein can be a port which, according to the ATX standard, is usually configured for the supply of −12 V DC. A port configured according to the ATX-standard for the supply of +5 V AUX (defined according to the ATX specification as pin no. 9) is not required in the example illustrated herein. This port can be reserved for a function during a conventional ATX operation, for example. In this way, for the voltage supply illustrated herein, an auxiliary voltage can be provided on a port of the connector plug, without influencing an additionally possible specification of the computer mainboard for a conventional ATX operation negatively or in a damaging manner.

The control logic may comprise an auxiliary voltage input by which the control logic can be operated by the auxiliary voltage received at the connector plug. Thus, the control logic of the computer mainboard can be operated independently from another supply voltage provided to the computer mainboard to detect the presence of the monitoring signal, for example. Once the latter measure is performed at least in certain situations prior to the actual activation of an external voltage supply device for providing the supply voltages specified for the computer mainboard, the auxiliary voltage received via the connector plug is reasonable and required, respectively, to be able to externally operate the control logic independently from an auxiliary energy (e.g., a battery) provided by the computer mainboard per se. It is also possible to operate the control logic exclusively via the auxiliary voltage received at the connector plug.

The computer mainboard may comprise a protective circuit connected to the following components:
the predetermined auxiliary voltage port at the connector plug,
the auxiliary voltage input of the control logic, as well as
the supply line of the computer mainboard.

The protective circuit is configured to secure, depending on the selected voltage supply option at the predetermined auxiliary voltage port of the connector plug (either the described auxiliary voltage or ATX (main) supply voltage), both the supply line of the computer mainboard and the auxiliary input of the control logic. Provision of the protective circuit allows operating the computer mainboard via a single connector plug alternatively either in a conventional ATX operation or according to the voltage supply concept described herein. The protective circuit prevents, in the respective case, a negative or damaging influence on the corresponding internal ports, supply lines and electronic components, which are possibly not used in the operating state or have another function.

In an example according to the ATX standard, the connector plug is configured to receive the monitoring signal at a predetermined monitoring port, which, according to the ATX standard, is conventionally configured to supply a power-ok signal (PWR-OK) of an ATX power supply unit. Such a PWR_OK port (according to the ATX specification defined as pin no. 8) serves, according to the ATX standard, the transmission of a signal that indicates through an ATC power supply unit that a state of providing the specific onboard supply voltages, in particular +12 V and −5 V, is reached.

According to the voltage supply example illustrated herein, this PWR_OK port of the connector plug is modified in term of the function thereof. In this case, it serves for transmission of the monitoring signal to the control logic. This is possible without further conflicts because the monitoring signal described herein is transmitted to the control logic before a voltage supply device of the external voltage supply is active at all, while a conventional PWR_OK signal according to the ATC standard is transmitted only when the voltage supply device (in particular the voltage conversion device) of a corresponding ATX power supply unit has been active already.

The connector plug may thus be configured to output the first control signal to a predetermined control port, which, according to the ATX standard, is configured to output an ATX control signal (PS_ON#) to turn on an ATX power supply unit. In this way, in the voltage supply concept illustrated herein, a control port can be used, which in the ATX standard also functions as a control port. This simplifies the implementation.

The computer mainboard may comprise a control signal circuit connected to the following components:
- an output of the control logic that generates the first control signal,
- a control line of the computer mainboard on which a second control signal can be provided, as well as
- to the predetermined control port at the connector plug.

The control signal circuit is configured to output the first control signal generated by the control logic at the predetermined control port of the connector plug, and to convert the second control signal subsequently provided at the control line of the computer mainboard such that the second control signal does not affect the output of the first control signal at the predetermined control port of the connector plug.

The control signal circuit configured this way may enable maintaining control signals of the computer mainboard (in particular of the second control signal) configured according to a predetermined specification without that the control signals affect the illustrated process. Thus, the control signals of the computer mainboard do not have a disturbing effect to the voltage supply concept described herein. Nevertheless, provision of extensive modifications of the signal generation and transmission in the computer mainboard is not required. This provides the advantage that the computer mainboard is capable of operating according to a predetermined specification (e.g., according to a conventional ATX operation), although the voltage supply concept described herein is used for the voltage supply.

The second control signal of the computer mainboard can, for example, be an ATX control signal by which the computer mainboard conventionally instructs an ATC power supply unit to activate a voltage conversion, i.e., to turn on the ATX power supply unit. Such an ATX control signal is known as PS_ON#-signal according to pin no. 16 of the ATX specification.

The control signal circuit converts this ATX control signal of the computer mainboard such that the ATX control signal does not affect the output of the first control signal at the predetermined control port of the connector plug. Because, according to the above explanations, the first control signal of the control logic already effects activation of an external voltage supply device. An additional ATX control signal (PS_ON#) of the computer mainboard to turn on an ATX power supply unit is thus superfluous. Nevertheless, in this regard, the operational behavior of the computer mainboard need not be adapted to the specific voltage supply concept of the type described herein. Rather, this voltage supply concept may be presented to the computer mainboard during the operation thereof in such a way as the computer mainboard would be operated in an ATX operation or a single operation. Thus, this voltage supply concept does not generally have any negative influence on operation of the computer mainboard configured conventionally apart from that.

The control logic is further configured to detect an ATX standby voltage signal (preferably different from the above described monitoring signal) supplied via a port of the connector plug according to the ATX standard, and cause an ATX operation of the computer mainboard according to the ATX standard upon detection of the ATX standby voltage signal. The ATX standby voltage signal can be a +5 V AUX signal defined at pin no. 9 of the connector plug according to the ATX specification.

Advantageously, the control logic is further configured to initiate an operation of the computer mainboard different from an ATX operation, if the ATX standby voltage signal is not detected (or present). Such an operation may either be an operation according to the voltage supply concept illustrated herein (control logic detects the above-explained monitoring signal) or, e.g., an operation via a single supply voltage (single operation, see above explanations). In the latter case, the above explained monitoring signal is not present or the control logic does not detect it, respectively. However, optionally, the control logic can possibly detect the presence of the single supply voltage in single operation.

As a result, basically three operating modes are possible:
1) Detection of the above described monitoring signal by the control logic prior to the start-up of the computer-mainboard leads to generation of the first control signal by the control logic, which in turn leads to provision of a supply voltage from an external supply voltage according to the voltage supply concept described herein. Advantageously, the control logic is in this case already operated via the above described auxiliary voltage.
2) Detection of the ATX standby voltage signal according to the ATX standard (see above explanations) by the control logic prior to the start-up of the computer mainboard leads to an ATX operation. The control logic is advantageously operated via this ATX standby voltage.
3) Non-detection of the ATX standby voltage signal and non-detection of the monitoring signal described in 1) as well as optionally detecting an individual supply voltage for a single operation by the control logic leads to a single operation. The control logic can advantageously be co-supplied via the single supply voltage here. Alternatively, it is possible to supply the control logic via an auxiliary voltage generated from the single supply voltage.

The voltage supply module is configured for the voltage supply of a computer mainboard of the type described above and comprises:
- a main voltage supply for provision of a supply voltage from an external input voltage,
- an auxiliary voltage converter that converts the external input voltage into an auxiliary voltage, as well as
- a power supply plug for electric cooperation with the connector plug at the computer mainboard for the supply of the computer mainboard with the supply voltage or auxiliary voltage specified for the computer mainboard.

The voltage supply module is configured to provide a monitoring signal at the power supply plug of the control logic of the computer mainboard, which indicates that the external input voltage comprises a predetermined specification. The monitoring signal is a signal separate from the external input voltage and the auxiliary voltage.

The monitoring signal provides the power supply plug with the information indicating that the external input voltage comprises a predetermined specific specification. This specific specification is different from, in particular, an ATX specification of a power supply plug according to the ATX standard. This indicates to the control logic in the mainboard that a special voltage supply concept is present, which the mainboard is capable to use. At the same time, it is advantageously prevented that a supply voltage is output to the computer mainboard, which the computer mainboard is not capable of processing or by which the computer mainboard can be damaged.

The main voltage supply may be a main voltage converter configured to convert the external input voltage into the supply voltage specified for the computer mainboard. The external input voltage can be higher or lower than the supply voltage specified for the computer mainboard. Depending on this, the main voltage converter can be configured as a step-down converter or as a step-up converter. Alternatively, the main voltage supply may merely be a switch element (switch) for switching an external supply line so that the external input voltage can be provided to the computer mainboard directly as a supply voltage.

The power supply plug may be designed as an ATX power supply plug according to the ATX standard. The power supply plug may be configured to output the at least one supply voltage specified for the computer mainboard, the auxiliary voltage and the monitoring signal at different ports.

It is possible to connect the power supply plug of the voltage supply module directly to the connector plug at the computer mainboard, i.e., to plug both plugs directly mechanically and electrically together. Alternatively, it is also possible to connect the power supply plug of the voltage supply module with the connector plug of the computer mainboard via a cable. The voltage supply module can be configured as a so-called expansion board for the computer mainboard, by which the computer mainboard can be adapted to the voltage supply concept illustrated herein.

The voltage supply module may comprise a monitoring circuit that monitors the external input voltage, wherein the monitoring circuit is configured to generate the monitoring signal when the external input voltage comprises the pre-determined specification. However, the monitoring signal is not generated when the external input voltage does not have the predetermined specification. The predetermined specification may be defined by a predetermined voltage range or the input voltage, for example. This voltage range can be predefined according to customer needs. Generally, the specification can also be defined in that the input voltage deviates from the supply voltage specified for the computer mainboard. Alternatively, the specification may merely define that the input voltage corresponds to the supply voltage specified for the computer mainboard, but originates from a specific voltage supply concept. Other parameters may alternatively or additionally determine the specification.

The main voltage supply may be configured to be activated or deactivated via a control signal provided from the control logic of the computer mainboard. That means that the control logic of the computer mainboard, as described above in conjunction with the computer mainboard, is capable of activating the main voltage supply of the voltage supply module when the alternative voltage supply provided by the voltage supply module is to be used to operate the computer mainboard. On the other hand, the control logic of the computer mainboard can deny a supply of the same if the voltage supply provided by the voltage supply module does not fulfil the predetermined criteria, i.e., the specified specification.

We also provide a method for voltage supply of a computer mainboard by at least one supply voltage specified for the computer mainboard, which is provided by a voltage supply module from an external input voltage.

The method comprises the following steps:
providing an auxiliary voltage from the external input voltage by the voltage supply module for operating a control logic of the computer mainboard,
providing a monitoring signal by the voltage supply module, wherein the monitoring signal indicates that the external input voltage has a predetermined specification,
detecting the monitoring signal by the control logic of the computer mainboard,
generating a first control signal by the control logic of the computer mainboard after the detection of the monitoring signal,
outputting the first control signal to the voltage supply module at a connector plug by a control signal circuit of the computer mainboard,
activating a main voltage supply of the voltage supply module to provide the supply voltage specified for the computer mainboard from the external input voltage depending on the first control signal,
providing the supply voltage specified for the computer mainboard to the computer mainboard, and
operating the computer mainboard by the provided supply voltage specified for the computer mainboard.

Such a method has the advantages described in conjunction with the computer mainboard and the voltage supply module. A computer mainboard and/or a voltage supply module of the above described type can be used to perform the method. In particular, the method allows a greater field of application of a computer mainboard, which can also be operated via a specific voltage supply concept of the type described above besides an ATC operation and a single operation.

The decisive factor in the method is that generation, provision and processing of control signals by components of the above described type as well as the respective time flow or order of generation, provision and processing of control signals is significantly different from generation, provision and processing of control signals during an ATX operation according to the ATX standard.

Advantageously, the method further comprises the steps of:
providing a second control signal at a control line of the computer mainboard after the step of generating and outputting the first control signal to the voltage supply module, and
converting the second control signal provided at the control line of the computer mainboard by the control signal circuit such that the second control signal does not affect the output of the first control signal at the connector plug.

The advantages described in conjunction with a control signal circuit of the computer mainboard result in analogy by these measures.

Further advantages, measures and features are disclosed in the following description of figures. Our mainboards, modules and methods will hereinafter be explained in greater detail by multiple figures.

FIG. 1 shows a schematic illustration of a comparison of a configuration of a connector plug for various power supply concepts that can be realized via an assembly according to FIG. 2, which will hereinafter be explained in more detail.

FIG. 1 illustrates configurations of the connector plug for three voltage supply concepts next to one another, i.e., a configuration for an ATX operation ("ATX"), a configuration for a 12V single operation ("12V") as well as a configuration according to an extended voltage supply concept via a voltage supply module ("extension board").

The decisive factor for the following explanations is that an ATX connector plug of a computer mainboard can be used for each of the specified voltage supply concepts. This means that the configurations illustrated in FIG. 1 each relate to an ATX connector plug and are different from one another in that the assignment of connector pins are modified or adapted, respectively.

The ATX configuration describes a conventional configuration of an ATX specification according to the ATX standard, wherein the connector plug 24 comprises main connector pins and four secondary connector pins. In particular, in this configuration, various supply voltages, in particular +/−12 V, +/−5 V and +/−3.3 V, an auxiliary voltage +5 V AUX as well as various control signals PS_ON#, PWR_OK can be exchanged. The COM ports relate to ground terminals. For the rest, reference is made to the customary use of a connector plug according to the ATX specification. A further explanation thereof is not required at this point.

The 12V configuration differs from the ATX configuration particularly in that a direct voltage +12V1 DC for supplying the computer mainboard downstream thereof is present on the main connector pins 10 and 11. A direct voltage +12V2 DC is also present on the secondary connector pins 3 and 4, which can be considered for supplying the computer mainboard. All other connector pins are assigned as voltage outputs (+3.3V out, +5V out) in this example. Alternatively, the other connector pins are not assigned (n/c).

The extension board configuration describes the configuration according to the illustrated extended voltage supply of a computer mainboard. Attention is to be drawn particularly to connector pins 8, 14 and 16 adapted for the extended voltage supply. A voltage signal Vin_ext_OK is present at connector pin 8, a voltage signal VIN_ext_DC is present at connector pin 14, and a control signal PS_ON# is present at connector pin 16. For the rest, the extension board configuration corresponds to the 12V configuration.

The above-mentioned signals will hereinafter be explained in greater detail in conjunction with an assembly of a voltage supply module 4 as well as a computer mainboard 1 according to FIG. 2 to realize the extension board configuration.

As illustrated in the example in FIG. 2, the voltage supply module 4 connects to the computer mainboard 1. The computer mainboard 1 operates a computer according to the intended use and comprises appropriate components (not illustrated here) to that end. For the rest, the computer mainboard 1 comprises a control logic 2 as well as an ATX connector plug 3. The control logic 2 serves as a deciding logic for the selection and control of various voltage supply according to FIG. 1 for supplying the computer mainboard 1. There may also be functions for an energy-saving operation of the computer mainboard 1 configured in the control logic 2 (so-called low power mode), which will, however, not be explained in greater detail here. The decisive factor merely is that the computer mainboard 1 is operable both in a normal operation and an energy-saving operation. In the energy-saving operation, an auxiliary voltage different from specified supply voltages can be sufficient, the auxiliary voltage being lower than the specified supply voltages. Advantageously, the auxiliary voltage is used to maintain the control logic 2 and possibly an energy-saving logic of the mainboard (not shown) which is integrated in the control logic 2 or separate from the control logic 2.

Besides the control logic 2 and the connector plug 3, the computer mainboard 1 comprises a protective circuit 8 as well as a control signal circuit 9, the functions of which will be explained hereinafter in greater detail.

Via the connector plug 3, predetermined signals are supplied to the computer mainboard 1 from the voltage supply module 1 or provided to the outside from the computer mainboard 1 in the direction of the voltage supply module 4. To that end, the voltage supply module 4 may comprise a corresponding power supply plug (not explicitly shown) for correspondingly forwarding signals of the illustrated signals. The voltage supply module 4 comprises a main voltage converter 5 that converts a provided external input voltage VEXT_DC, VEXT_AC into a supply voltage +12V DC specified for the computer mainboard 1. Furthermore, the voltage supply module 4 comprises an auxiliary voltage converter 6 for converting the external input voltage VEXT_DC, VEXT_AC into an auxiliary voltage Vin_ext_DC.

Furthermore, the voltage supply module 4 is configured to provide a monitoring signal Vin_ext_OK different from the external input voltage VEXT_DC, VEXT_AC and the auxiliary voltage Vin_ext_DC, which indicates that the external input voltage VEXT_DC, VEXT_AC has a predetermined specification. For example, this can mean that the external input voltage deviates from the at least one supply voltage +12V DC specified for the computer mainboard 1. To that end, the voltage supply module 4 comprises a monitoring circuit 7 for monitoring the external input voltage VEXT_DC, VEXT_AC. In particular, the monitoring circuit 7 is configured to generate the monitoring signal Vin_ext_OK (see FIG. 1), when the external input voltage VEXT_DC, VEXT_AC has a predetermined specification.

The signals +12V DC, Vin_ext_OK, Vin_ext_DC as well as ground (GND) can be provided to the computer mainboard 1 via the connector plug 3 at predetermined connector pins +12V1 DC, +12V2 DC, PWR_OK, −12V DC and COM (see in particular connector pins 8, 10, 11, 14 and 16 of the main connector pins as well as connector pins 3 and 4 of the secondary connector pins of FIG. 1, extension board configuration).

The predetermined specification of the external input voltage VEXT_DC, VEXT_AC sets, inter alia, a voltage range, in which the external input voltage VEXT_AC, VEXT_DC is to be located to be accepted by the control logic 2 of the computer mainboard 1. For example, the voltage range can be set in accordance with customer needs. A typical absolute value of the external input voltage VEXT_DC, VEXT_AC may be +24 V DC or 24 V AC, for example. The external input voltage VEXT_DC, VEXT_AC can be provided from an external power supply unit (not illustrated) or a current rail of a bus system of an industrial plant (neither illustrated).

If the external input voltage VEXT_DC, VEXT_AC is present in the desired specification, the monitoring circuit 7 recognizes it and generates the monitoring signal Vin_ext_OK, which is provided to the computer mainboard 1 at connector pin PWR_OK of the connector plug 3 and which is transmitted to the control logic 2. Simultaneously, the auxiliary voltage converter 6 converts the provided external input voltage VEXT_DC, VEXT_AC into the auxiliary voltage Vin_ext_DC and provides it to the computer mainboard 1 at connector pin −12 V DC for supplying the control logic 2 via the auxiliary voltage input Vin_ext_DC_Mainboard thereof. This auxiliary voltage can also be used for the remaining mainboard logic, often realized in the chip set of the computer mainboard, which is to be supplied in the energy-saving mode. Securing a supply line −12VDCMainboard of the computer mainboard 1 is effected via the protective circuit 8, which is configured according to the ATX standard to receive and process a voltage −12V (see main connector pin 14 of the ATX configuration in FIG. 1) during an ATX operation of the computer mainboard 1.

Figure 3A:
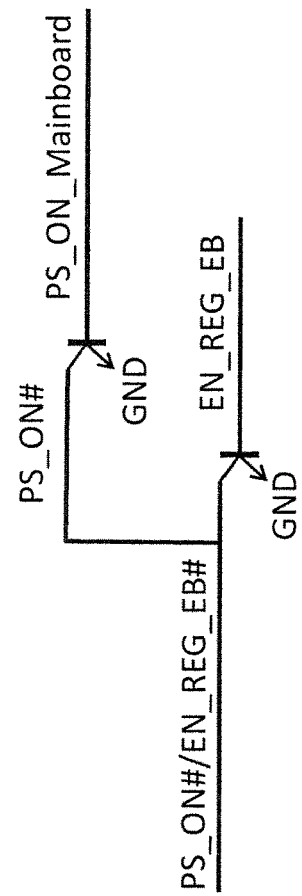
FIG. 3A is a schematic illustration of an example of a protective circuit in a computer mainboard according to FIG. 2.

FIG. 3A illustrates an example of the protective circuit 8 once more in greater detail. In particular, the protective circuit 8 comprises two diodes D1 and D2. Diode D1 secures the supply line −12VDCMainboard when operating the connector pin −12 VDC via the auxiliary voltage Vin_ext_DC, while diode D2 ensures the auxiliary voltage Vin_ext_DC to be forwarded to the auxiliary voltage input Vin_ext_Mainboard of the control logic 2 in this operation. On the other hand, diode D2 secures the auxiliary voltage input Vin_ext_Mainboard of the control logic 2 during operation of the connector pins −12 VDC according to the conventional ATX operation via a voltage −12 V, while diode D1, in this ATX operation, ensures the voltage −12 V to be forwarded to the supply line −12VDCMainboard. As an alternative to this example, it is also possible to use more complex protective circuits in place of the one or both diodes, which comprise the same functionality.

With reference to FIG. 2, the control logic 2 finally detects the monitoring signal Vin_ext_OK and, thereupon, generates a signal EN_REG_EB for activating the main voltage converter 5 of the voltage supply module 4. The signal EN_REG_EB of the control logic 2 effects, in the control signal circuit 9, that the first control signal EN_REG_EB# is provided at a control port PS_ON# of the connector plug 3 in the direction of the voltage supply module 4, wherein the signal EN_REG_EB# is provided at a control input of the main voltage converter 5 and effects activation of the main voltage converter 5.

After that, the main voltage converter 5 starts converting the voltage of the external voltage VEXT_DC, VEXT_AC so that the predetermined supply voltage +12V1 DC can be provided to the computer mainboard 1 therefrom at the connector pins +12V1 DC and +12V2 DC to operate the computer mainboard 1.

If now the computer mainboard 1, which is specified for an ATX operation beyond the specifications illustrated in FIG. 2, generates a second control signal PS_ON_Mainboard at an internal control line, this second control signal is converted into a control signal PS_ON# in the control signal circuit 9. The control signal PS_ON# effects, according to the ATX standard, the instruction to an ATX power supply unit of activating a voltage conversion.

Nevertheless, according to the configuration of FIG. 2, the control signal PS_ON_Mainboard or PS_ON# does not affect a control of the main voltage converter 5 of the voltage supply module 4 because the control signal circuit 9 converts the control signal PS_ON_Mainboard or PS_ON# such that the second control signal PS_ON_Mainboard does not affect the output of the first control signal EN_REG_EB# at the predetermined control port PS_ON# of the connector plug 3.

Figure 3B:
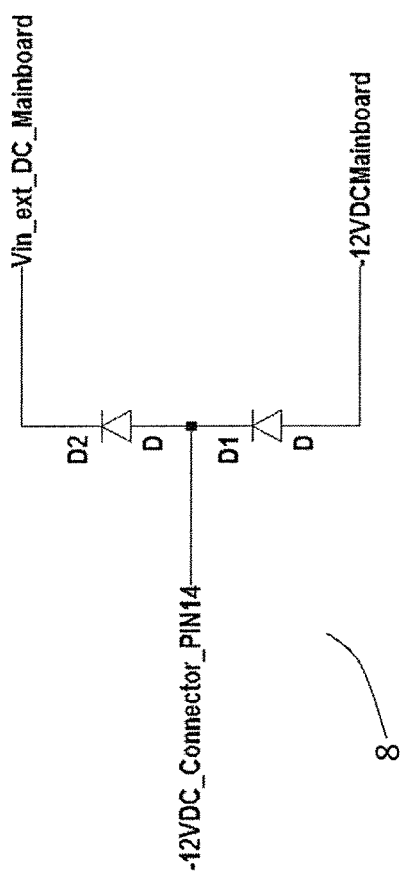
FIG. 3B is a schematic illustration of an example of a control signal circuit in a computer mainboard according to FIG. 2.

FIG. 3B shows an example of the control signal circuit 9 once more in greater detail. The control signal circuit 9 particularly comprises 2 switch elements, namely bipolar transistors in the co-called open collector circuit, which are coupled in the circuit. This effects that a signal level of the signal line PS_ON#/EN_REG_EB# is lowered by the first control signal EN_REG_EB of the control logic 2 to a reference potential so that a corresponding activation is effected at the control input of the main voltage converter 5 (see FIG. 2). A subsequent provision of the second control signal PS_ON_Mainboard effects a lowering of the signal level on the signal line PS_ON#, wherein this does no longer affect the signal line PS_ON#/EN_REG_EB#, since the latter had been lowered to the reference potential already.

Thus, the control signal circuit 9 according to FIG. 3B provides the advantage that control signals of the computer mainboard 1 can be maintained according to the ATX standard and are also generated by the computer mainboard 1 according to the ATX specification, but this, however, is neutralized in the specific voltage supply concept according to FIG. 2 and does not have any negative influence on the voltage supply. One or both of the transistors illustrated in FIG. 3B can also be replaced by similar or more complex protective circuits having the same functionality. For example, in place of the bipolar transistors, field effect transistors (e.g., so-called MOSFETs) or logic components (so-called logic ICs) can be used.

In this way, the computer mainboard 1 can be operated via the voltage supply illustrated in FIG. 2 and explained in greater detail above, without that other extensive modifications be required to the computer mainboard 1 beyond the required modifications illustrated in FIG. 2.

Figure 4:
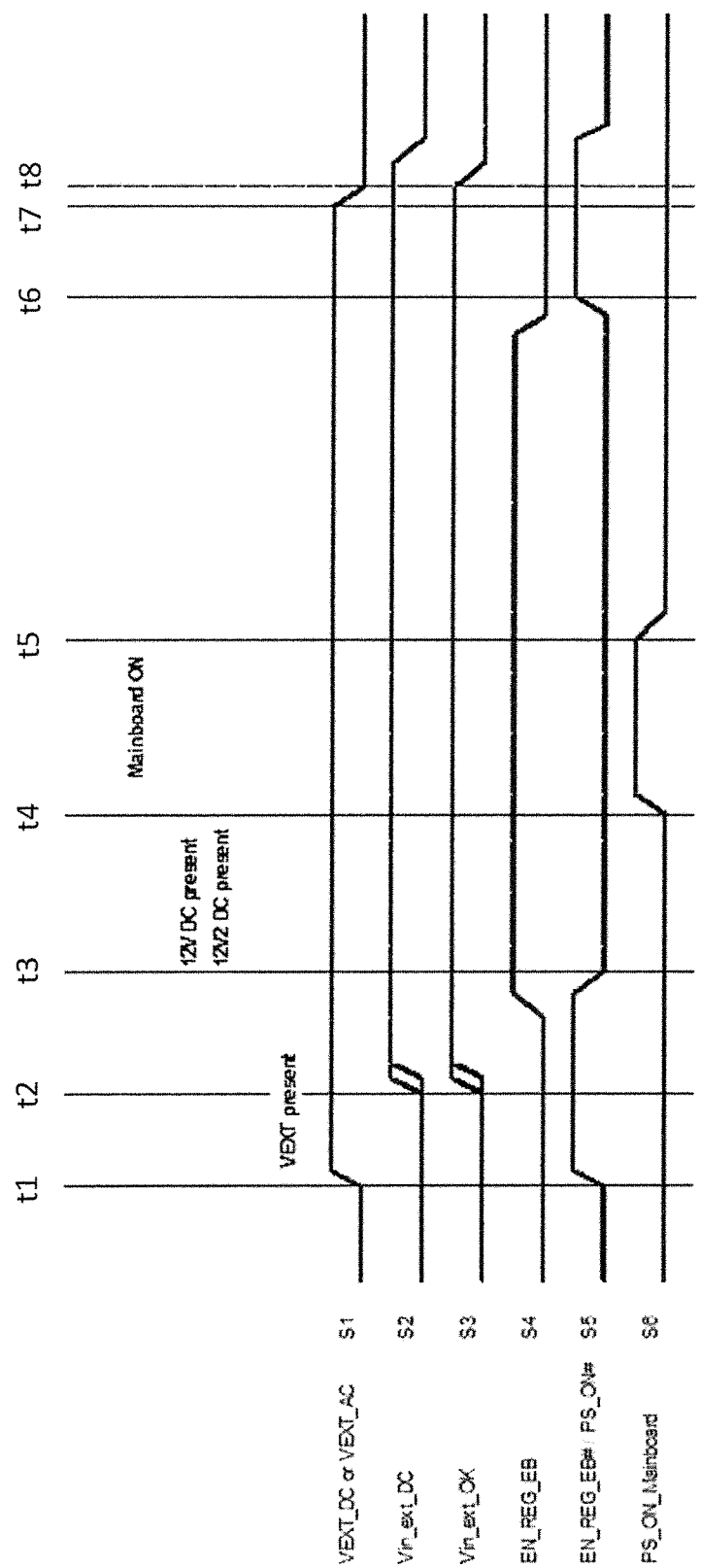
FIG. 4 is a schematic illustration of a flow chart of various signals in an assembly according to FIG. 2.

FIG. 4 shows a schematic illustration of a flow chart of various signals in the assembly according to FIG. 2. In particular, the diverse signals of the above-described type are illustrated in individual states S1 to S6 in their course of signals.

At time t1, the external input voltage VEXT_DC, VEXT_AC is available, wherein in the main voltage converter 5 (see FIG. 2) the control signal EN_REG_EB# and thus also the control signal PS_ON# are set to high. At time t2, the auxiliary voltage Vin_ext_DC converted by the auxiliary voltage converter 6 (see FIG. 2) and the monitoring signal Vin_ext_OK generated by the monitoring circuit 7 (see FIG. 2) are present (corresponding high levels). The auxiliary voltage Vin_ext_DC is present as soon as the auxiliary voltage converter 6 has a suitable input voltage. The monitoring signal Vin_ext_OK is present as soon as the external input voltage VEXT_DC, VEXT_AC is in a valid tolerance range.

The generated monitoring signal Vin_ext_OK effects an increase of the signal level EN_REG_EB in the control logic 2 (see FIG. 2) after the control logic 2 detected the monitoring signal Vin_ext_OK. The control logic 2 may immediately set or delay the signal EN_REG_EB after detection of a valid level of the monitoring signal Vin_ext_OK. A delay in setting of EN_REG_EB increases the operation security in a way that a short-term application or driving through the valid specification range of VEXT_DC, VEXT_AC does not lead to the short-term turning-on of the main voltage converter 5 and thus the computer mainboard 1. Increasing the signal level EN_REG_EB results in that at time t3 the control signal and thus also the control signal EN_REG_EB# are set to low, which results in an activation of the main voltage converter 5. Thus, a supply voltage is provided to the computer mainboard 1 as from time t3. At time t4, the computer mainboard 1 generates the second control signal PS_ON_Mainboard (corresponding high level), which however does not affect the remaining signals—as described above. Until time t5, the computer mainboard 1 is in a normal operation, and the computer mainboard 1 abandons this normal operation again at time t5 (lowering PS_ON_Mainboard). For example, the computer mainboard 1 enters a simple energy-saving state or turns-off all or certain components. Between t5 and t6, the mainboard could enter normal operation again, which would be effected by the signal PS_ON_Mainboard, as described above. This would result in a jump back to t4. For as long as the computer mainboard 1 does not indicate to the control logic 2 that the computer mainboard 1 intends to enter an extended energy-saving state (which may be different from the simple energy-saving state), or has already entered this state, the main voltage converter 5 remains turned-on.

If the control logic 2 is indicated, by a signal from the computer mainboard 1 (not illustrated) that the computer mainboard 1 can be set in the extended energy-saving state or is already in the extended energy-saving state, the control signal EN_REG_EB is lowered by the control logic 2 after a time delay, to turn-off the main voltage converter 5. Thus, in an extended energy-saving state, the losses of the main voltage converter 5 are saved additionally, leading to a minimization of the standby losses. This results in that at time t6, the control signal EN_REG_EB#/PS_ON# is set to high again. Thus, a voltage conversion in the main voltage converter 5 is deactivated.

At time t7, a failure of the external input voltage VEXT_DC, VEXT_AC occurs, which directly results in the failure of the monitoring signal Vin_ext_OK (time t8). The control logic 2 is capable of detecting this and bringing the computer mainboard 1 into a completely turned-off state in a controlled manner. Shortly after time t8, finally also the auxiliary voltage Vin_ext_DC fails due to the failure of the external input voltage VEXT_DC, VEXT_AC. The control signal EN_REG_EB#/PS_ON# also falls to low again. Furthermore, the control logic 2 can be capable, in normal operation or in an energy-saving state, of communicating (not shown) a failure of VEXT_DC, VEXT_AC or an abandonment of the specification of VEXT_DC, VEXT_AC to the computer mainboard 1 via a signal so that the computer mainboard 1 can be turned-off in a controlled fashion before the main voltage 12V DC drops.

The extended voltage supply illustrated herein enables connecting a voltage supply module 4 with a main voltage supply device (main voltage converter 5) to a correspondingly modified computer mainboard 1.

Advantageously, this is effected via the ATC connector plug already present at the computer mainboard 1, as the only connection between the voltage supply module 4 and the computer mainboard 1. An additional plug can thus be saved at the computer mainboard 1, which leads to a significant space-saving. The material costs for the additional voltage supply option can also be reduced to a minimum level at the computer mainboard 1, as the more cost-intensive components can be realized on the voltage supply module 4.

The illustrated structures are merely selected in an exemplary manner.

The invention claimed is:

1. A computer mainboard comprising:
   components intended for operating a computer,
   a control logic that controls voltage supply of the computer mainboard, and
   a connector plug that is configured as an ATX power supply plug according to the ATX specification and that receives at least one supply voltage specified for the computer mainboard, an auxiliary voltage and a monitoring signal that indicates the presence of an external supply voltage that has a predetermined specification being different from the ATX specification,
   wherein the control logic is configured to detect the monitoring signal via the connector plug and, after detection of the monitoring signal, to generate a first control signal and output the first control signal via the connector plug so that, depending thereon, an external voltage supply device can be activated to provide the at least one supply voltage specified for the computer mainboard from the external supply voltage being different from the ATX specification,
   wherein the connector plug is configured to output the first control signal at a predetermined control port, which is configured according to the ATX specification to output an ATX control signal to turn on an ATX power supply unit, and
   the computer mainboard further comprising a control signal circuit connected to the following components:
   an output of the control logic that generates the first control signal,
   a control line of the computer mainboard, separate from the control logic, on which a second control signal is provided, wherein the second control signal of the computer mainboard is generated by the computer mainboard according to the ATX specification to activate an external ATX power supply unit, and
   the predetermined control port at the connector plug,
   wherein the control signal circuit is configured to output the first control signal generated by the control logic at the predetermined control port of the connector plug and convert the second control signal subsequently provided at the control line of the computer mainboard such that the second control signal does not affect the output of the first control signal at the predetermined control port of the connector plug.

2. The computer mainboard according to claim 1, wherein the connector plug is configured to receive the auxiliary voltage at a predetermined auxiliary voltage port, which is configured according to the ATX specification to supply an ATX supply voltage on a supply line of the computer mainboard.

3. The computer mainboard according to claim 1, wherein the control logic comprises an auxiliary voltage input by which the control logic is operable by the auxiliary voltage received at the connector plug.

4. The computer mainboard according to claim 2, further comprising a protective circuit connected to the following components:
   the predetermined auxiliary voltage port at the connector plug,
   the auxiliary voltage input of the control logic, and
   the supply line of the computer mainboard,
   wherein the protective circuit is configured to protect either the supply line of the computer mainboard or the auxiliary voltage input of the control logic against negative or damaging influence depending on whether the predetermined auxiliary voltage port at the connector plug is applied with either the auxiliary voltage or the ATX supply voltage.

5. The computer mainboard according to claim 1, wherein the connector plug is configured to receive the monitoring signal at a predetermined monitoring port, which is configured according to the ATX specification to supply a power-ok signal of an ATX power supply unit.

6. The computer mainboard according to claim 1, wherein the control logic is further configured to detect an ATX standby voltage signal according to the ATX specification supplied via a port of the connector plug and, upon detection of the ATX standby voltage signal, to cause an ATX operation of the computer mainboard according to the ATX specification.

7. The computer mainboard according to claim 3, further comprising a protective circuit connected to the following components:
   the predetermined auxiliary voltage port at the connector plug,
   the auxiliary voltage input of the control logic, and
   the supply line of the computer mainboard,
   wherein the protective circuit is configured to protect either the supply line of the computer mainboard or the auxiliary voltage input of the control logic against negative or damaging influence depending on whether the predetermined auxiliary voltage port at the connector plug is applied with either the auxiliary voltage or the ATX supply voltage.

8. An assembly comprising a computer mainboard comprising:

components intended for operating a computer, a control logic that controls voltage supply of the computer mainboard, and a connector plug that is configured as an ATX power supply according to the ATX specification and that receives at least one supply voltage specified for the computer mainboard, an auxiliary voltage and a monitoring signal that indicates the presence of an external supply voltage that has a predetermined specification being different from the ATX specification, wherein the control logic is configured to detect the monitoring signal via the connector plug and, after detection of the monitoring signal, to generate a first control signal and output the first control signal via the connector plug so that, depending thereon, an external voltage supply device can be activated to provide the at least one supply voltage specified for the computer mainboard from the external supply voltage being different from the ATX specification, wherein the connector plug is configured to output the first control signal at a predetermined control port, which is configured according to the ATX specification to output an ATX control signal to turn on an ATX power supply unit, and the computer mainboard further comprising a control signal circuit connected to the following components:

an output of the control logic that generates the first control signal, a control line of the computer mainboard, separate from the control logic, on which a second control signal is provided, wherein the second control signal of the computer mainboard is generated by the computer mainboard according to the ATX specification to activate an external ATX power supply unit, the predetermined control port at the connector plug, wherein the control signal circuit is configured to output the first control signal generated by the control logic at the predetermined control port of the connector plug and convert the second control signal subsequently provided at the control line of the computer mainboard such that the second control signal does not affect the output of the first control signal at the predetermined control port of the connector plug, and a voltage module for voltage supply of the computer mainboard, comprising:

a main voltage supply that provides a supply voltage specified for the computer mainboard from an external input voltage, an auxiliary voltage converter that converts the external input voltage into an auxiliary voltage, and a power supply plug that electrically cooperates with the connector plug at the computer mainboard to supply the computer mainboard with the supply voltage, specified for the computer mainboard or the auxiliary voltage, wherein the power supply plug is configured as an ATX power supply plug according to the ATX specification, and the voltage supply module is configured to provide a monitoring signal at a power supply plug of the control logic of the computer mainboard, which indicates that the external input voltage has a predetermined specification being different from the ATX specification.

9. The assembly according to claim 8, wherein the voltage supply module comprises a monitoring circuit that monitors the external input voltage, wherein the monitoring circuit is configured to generate the monitoring signal if the external input voltage has the predetermined specification.

10. The assembly according to claim 8, wherein the main voltage supply is configured to be activated or deactivated via a control signal provided by the control logic of the computer mainboard.

11. A method of supplying voltage to a computer mainboard by at least one supply voltage specified for the computer mainboard, which is provided by a voltage supply module from an external input voltage by a voltage supply module, comprising:

providing an auxiliary voltage from the external input voltage by the voltage supply module for operating a control logic of the computer mainboard, the auxiliary voltage being provided over a connector plug on the computer mainboard, wherein the connector plug is configured as an ATX power supply according to the ATX specification, providing a monitoring signal by the voltage supply module to the computer mainboard over the connector plug, wherein the monitoring signal indicates that the external input voltage has a predetermined specification being different from the ATX specification, detecting the monitoring signal by the control logic of the computer mainboard, generating a first control signal by the control logic of the computer mainboard after detection of the monitoring signal, outputting the first control signal to the voltage supply module at a predetermined control port of the connector plug by a control signal circuit of the computer mainboard, wherein the predetermined control port is configured according to the ATX specification to output an ATX control signal to turn on an ATX power supply unit, activating a main supply voltage of the voltage supply module for providing the supply voltage specified for the computer mainboard from the external input voltage depending on the first control signal, providing the supply voltage, specified for the computer mainboard, to the computer mainboard, operating the computer mainboard by the provided supply voltage specified for the computer mainboard, and further comprising:

providing a second control signal at a control line of the computer mainboard, separate from the control logic, after the step of generating and outputting the first control signal to the voltage supply module, wherein the second control signal of the computer mainboard is generated by the computer mainboard according to the ATX specification to activate an external ATX power supply unit, and converting the second control signal provided on the second control line of the computer mainboard by the control signal circuit such that the second control signal does not affect the output of the first control signal at the predetermined control port of the connector plug, wherein the control signal circuit is connected to the following components:

an output of the control logic that generates the first control signal, the control line of the computer mainboard on which the second control signal is provided, and
the predetermined control port at the connector plug.

\* \* \* \* \*